(12) United States Patent
Holzgrefe et al.

(10) Patent No.: US 7,481,201 B2
(45) Date of Patent: Jan. 27, 2009

(54) FUEL INJECTION VALVE

(75) Inventors: Volker Holzgrefe, Ditzingen (DE); Stefan Arndt, Stuttgart (DE); Juergen Raimann, Weil der Stadt (DE); Joerg Heyse, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 320 days.

(21) Appl. No.: 10/503,882

(22) PCT Filed: Dec. 23, 2002

(86) PCT No.: PCT/DE02/04731

§ 371 (c)(1), (2), (4) Date: Jun. 28, 2005

(87) PCT Pub. No.: WO03/067076

PCT Pub. Date: Aug. 14, 2003

(65) Prior Publication Data

US 2006/0043218 A1 Mar. 2, 2006

(30) Foreign Application Priority Data

Feb. 5, 2002 (DE) ................................ 102 04 656

(51) Int. Cl.
*F02M 61/14* (2006.01)
*F02M 61/18* (2006.01)
(52) U.S. Cl. .................... 123/470; 239/533.12
(58) Field of Classification Search ............... 123/472, 123/198 D, 467, 470, 478; 239/533.12, 568, 239/562
See application file for complete search history.

(56) References Cited

U.S. PATENT DOCUMENTS

| | | | | |
|---|---|---|---|---|
| 3,820,945 | A | * | 6/1974 | Vignes ........................ 431/349 |
| 4,057,190 | A | * | 11/1977 | Kiwior et al. ............... 239/558 |
| 4,519,370 | A | | 5/1985 | Iwata |
| 4,767,061 | A | * | 8/1988 | Ingemansson ............... 239/566 |
| 6,070,811 | A | * | 6/2000 | Takeda et al. .......... 239/533.12 |
| 6,155,504 | A | * | 12/2000 | Sugimoto et al. ........... 239/596 |
| 6,161,781 | A | * | 12/2000 | Kojima et al. .......... 239/533.12 |
| 6,267,307 | B1 | * | 7/2001 | Pontoppidan ............ 239/585.4 |
| 6,823,833 | B2 | * | 11/2004 | Ismailov ..................... 123/299 |

(Continued)

FOREIGN PATENT DOCUMENTS

DE 198 04 463 8/1999

(Continued)

OTHER PUBLICATIONS

English Language Abstract of JP 7-197871.

(Continued)

*Primary Examiner*—Mahmoud Gimie
(74) *Attorney, Agent, or Firm*—Kenyon & Kenyon LLP

(57) ABSTRACT

A fuel injector for fuel-injection systems of internal combustion engines includes a solenoid coil, a valve needle that is in operative connection with the solenoid coil and acted upon by a restoring spring in a closing direction in order to actuate a valve-closure member which forms a sealing seat together with a valve-seat surface formed at a valve-seat member, and at least two spray-discharge orifices, which are formed in the valve-seat member. In a discharge region, the spray-discharge orifices are in connection with capillaries formed in the end face of the valve-seat member.

10 Claims, 2 Drawing Sheets

U.S. PATENT DOCUMENTS

2003/0116653 A1* 6/2003 Doll et al. .............. 239/533.12
2005/0284965 A1* 12/2005 Schneider .............. 239/533.12

FOREIGN PATENT DOCUMENTS

| | | |
|---|---|---|
| DE | 199 11 928 | 9/1999 |
| EP | 0 610 229 | 8/1994 |
| JP | 59-087271 | 5/1984 |
| JP | 61-207875 | 9/1986 |
| JP | 07-035003 | 2/1995 |
| JP | 10-299617 | 11/1998 |
| JP | 1-1270440 | 10/1999 |
| JP | 2000-345944 | 12/2000 |
| WO | WO 03/031806 | 4/2003 |

OTHER PUBLICATIONS

English Language Abstract of JP 1-1270440.

* cited by examiner

FUEL INJECTION VALVE

FIELD OF THE INVENTION

The present invention relates to a fuel injector.

BACKGROUND INFORMATION

German Published Patent Application No. 198 04 463 discusses a fuel-injection system for a mixture-compressing internal combustion engine having external ignition, which includes a fuel injector that injects fuel into a combustion chamber having a piston/cylinder arrangement and a spark plug projecting into the combustion chamber. The fuel injector may be provided with at least one row of injection orifices distributed across the circumference of the fuel injector. By selectively injecting fuel via the injection orifices, a jet-directed combustion method may be realized by a mixture cloud being formed using at least one jet.

The fuel injector of the aforementioned printed publication may form deposits in the spray-discharge orifices that may clog the orifices and cause an unacceptable reduction in the flow rate through the injector. This may lead to malfunctions of the internal combustion engine.

SUMMARY OF THE INVENTION

An exemplary fuel injector according to the present invention provides capillaries in the region of the spray-discharge orifices, which shunt the fuel away from the discharge region of the spray-discharge orifices, so that no fuel is able to deposit in the region of the spray-discharge orifices.

Each of the spray-discharge orifices may be provided with its own capillary, or a plurality of capillaries may be provided for each spray-discharge orifice.

The capillaries may be produced in a simple and cost-effective manner by any cutting or non-cutting method, such as, for example, laser drilling, etching, milling, or knurling.

The arrangement of the capillaries may be adaptable to any requirement by varying their extension across the surface of the valve-seat member, their number or their depth.

DETAILED DESCRIPTION

Figure 1:
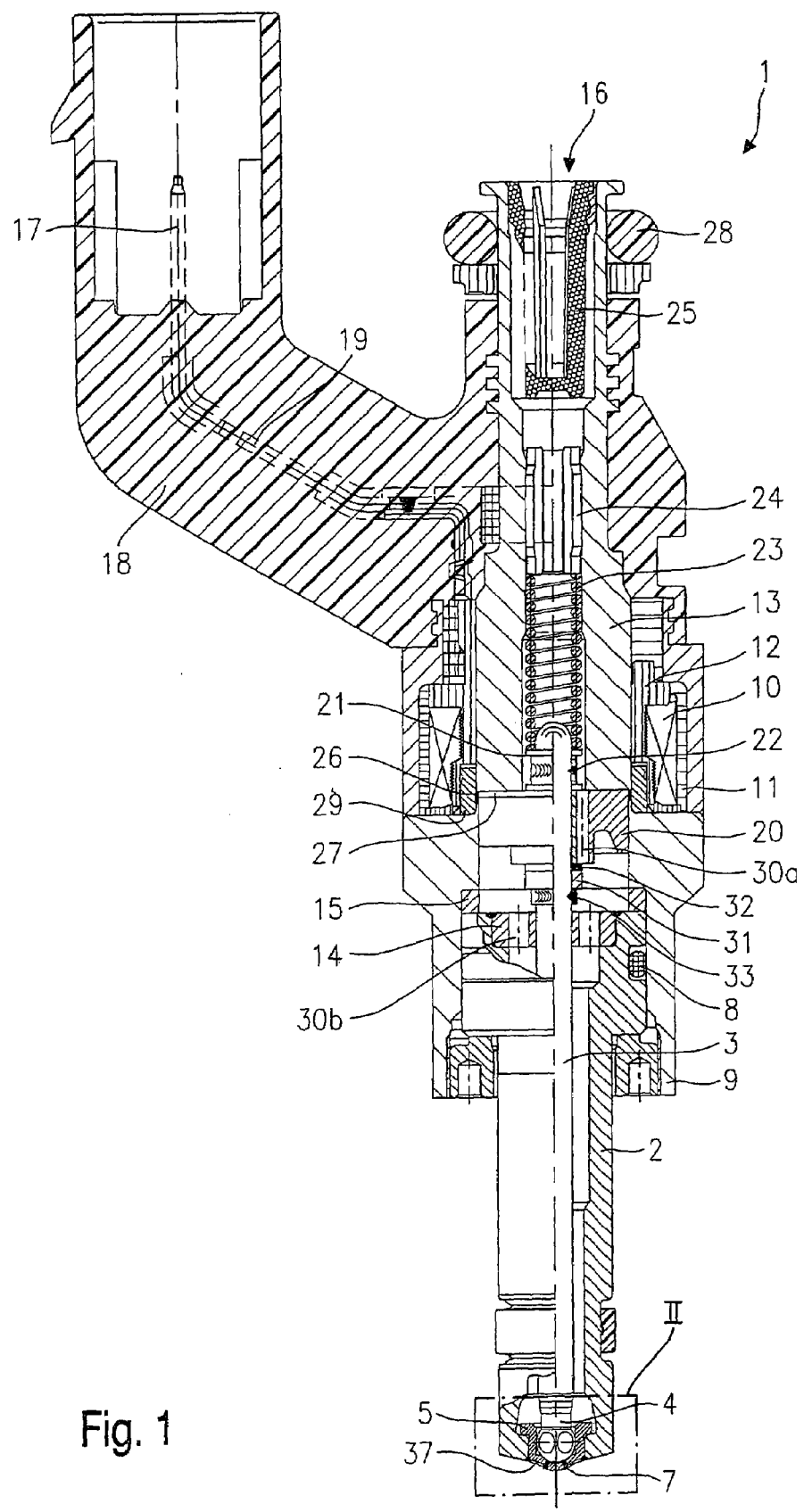
FIG. 1 shows a schematic cross-sectional view through an exemplary embodiment of a fuel injector configured according to the present invention.

In a part-sectional representation, FIG. 1 shows an exemplary embodiment of a fuel injector 1 configured according to the present invention. Fuel injector 1 is configured in the form of a fuel injector for fuel-injection systems of mixture-compressing internal combustion engines having external ignition and may be suited for the direct injection of fuel into a combustion chamber (not shown) of an internal combustion engine.

Fuel injector 1 includes a nozzle body 2 in which a valve needle 3 is positioned. Valve needle 3 is in operative connection with a valve-closure member 4, which cooperates with a valve-seat surface 6 positioned on a valve-seat member 5 to form a sealing seat. In the exemplary embodiment, fuel injector 1 is an inwardly opening fuel injector 1, which has a plurality of spray-discharge orifices 7.

Valve-closure member 4 of fuel injector 1 configured according to an exemplary embodiment of the present invention has a nearly spherical form, thereby achieving an offset-free, cardanic valve-needle guidance, which may provide precise functioning of fuel injector 1.

Valve-seat member 5 of fuel injector 1 has a virtually cup-shaped configuration and by its form contributes to the valve-needle guidance. Valve-seat member 5 is inserted in a discharge-side recess 34 of nozzle body 2 and joined to nozzle body 2 by a welding seam 35.

Seal 8 seals nozzle body 2 from an outer pole 9 of a magnetic coil 10. Magnetic coil 10 is encapsulated in a coil housing 11 and wound on a coil brace 12, which rests against an inner pole 13 of magnetic coil 10. Inner pole 13 and outer pole 9 are separated from one another by a gap 26 and are braced against a connecting member 29. Magnetic coil 10 is energized via a line 19 by an electric current, which may be supplied via an electrical plug contact 17. A plastic extrusion coat 18, which may be extruded onto inner pole 13, encloses plug contact 17.

Valve needle 3 is guided in a valve-needle guide 14, which is disk-shaped. A paired adjustment disk 15 is used to adjust the (valve) lift. On the other side of adjustment disk 15 is an armature 20, which, via a first flange 21, is connected by force-locking to valve needle 3, which is connected to first flange 21 by a welding seam 22. Braced on first flange 21 is a restoring spring 23 which is prestressed by a sleeve 24 in the present exemplary embodiment of fuel injector 1.

On the discharge-side of armature 20 is a second flange 31, which is used as lower armature stop. It is connected to valve needle 3 in force-locking manner via a welding seem 33. An elastic intermediate ring 32 is positioned between armature 20 and second flange 31 in order to damp armature bounce during closing of fuel injector 1.

Extending in valve-needle guide 14, in armature 20 and in valve-seat member 5 are fuel channels 30a through 30c. The fuel is supplied via a central fuel supply 16 and filtered by a filter element 25. A seal 28 seals fuel injector 1 from a distributor line (not shown further).

According to an exemplary embodiment of the present invention, fuel injector 1 is provided with capillaries 37 at an end face 36 of valve-seat member 5 facing the combustion chamber (not shown further) of the internal combustion chamber, the valve-seat member being arranged in a recess 34 of nozzle body 2 and connected thereto by a welding seam 35, for example. Capillaries 37 shunt the fuel that emerges from the one outlet region 38 of spray-discharge orifices 7 radially toward the outside in a capillary manner, thereby ensuring that no fuel film is able to deposit in spray-discharge orifices 7 or in outlet region 38. The discharge-side section of fuel injector 1 with capillaries 37 is shown in greater detail in FIGS. 2 and 3 and elucidated in the following description.

In the rest state of fuel injector 1, restoring spring 23 acts upon first flange 21 at valve needle 3, counter to its lift direction, so that valve-closure member 4 is retained in sealing contact against valve seat 6. Armature 20 rests on intermediate ring 32, which is supported on second flange 31. In response to excitation of magnetic coil 10, it builds up a magnetic field which moves armature 20 in the lift direction, against the spring force of restoring spring 23. Armature 20 carries along first flange 21, which is welded to valve needle 3, and thus valve needle 3, in the lift direction as well.

Valve-closure member 4, being in operative connection with valve needle 3, lifts off from valve seat surface 6, thereby spray-discharging the fuel.

When the coil current is turned off, once the magnetic field has sufficiently decayed, armature 20 falls away from inner pole 13, due to the pressure of restoring spring 23 on first flange 21, whereupon valve needle 3 moves in a direction counter to the lift. As a result, valve closure member 4 comes to rest on valve-seat surface 6, and fuel injector 1 is closed. Armature 20 comes to rest against the armature stop formed by second flange 31.

Figure 2:
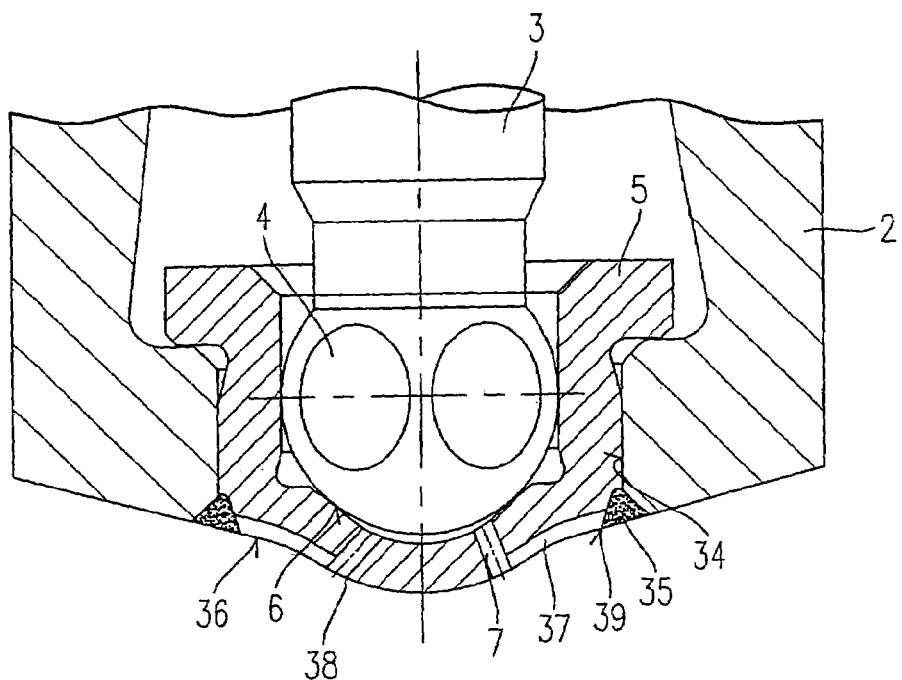
FIG. 2 shows a schematic cross-sectional view through the discharge-side part of the first exemplary embodiment of the fuel injector shown in region II of FIG. 1.

In a part-sectional view, FIG. 2 shows an enlarged view of the cut-away portion designated II in FIG. 1.

As already indicated in FIG. 1, valve-seat member 5, at its end face 36 facing the combustion chamber, is provided with capillaries 37, which extend radially toward the outside from an outlet region 38 of each spray-discharge orifice 7. Capillaries 37, having a desired profile, such as, for example, a U-profile, are introduced in end face 36 of valve-seat member 5 and extend, for example, up to a radially outer edge 39 of valve-seat member 5.

Spray-discharge orifices 7 in valve-seat member 5 may be realized in any area of valve-seat member 5. They may be arranged in a plurality of round or elliptical hole circles, which may be in a concentric or eccentric arrangement with respect to one another, or they may be arranged in a plurality of straight or curved hole circles, which are arranged in parallel, diagonally or at an offset with respect to one another. The spacing between the hole centers may be equidistant or different, but it should be at least one hole diameter for reasons of production engineering. The spatial orientation may vary for each hole axis, as shown in FIG. 2 for two spray-discharge orifices 7.

Because of capillaries 37, which extend from spray-discharge orifices 7 toward the outside across the surface of valve-seat member 5, the coking of spray-discharge orifices 7 may be reduced. Since the diameter of spray-discharge orifices 7 may be approximately 100 μm, the danger of spray-discharge orifices 7 getting clogged over time by the formation of deposits and the flow rate being unacceptably restricted as a result, may be relatively high. As a result of capillaries 37, a fuel film depositing on valve-seat member 5 is able to be shunted away from spray-discharge orifices 7, thereby avoiding fuel deposition and subsequent coking during combustion of the combustion-chamber fill.

In order to prevent coking, capillaries 37 should have an adequate depth, so as to shunt sufficient fuel. The maximum depth may amount to up to 75% of the wall thickness of valve-seat member 5. To obtain a satisfactory capillary effect, capillaries 37 should not be larger than 20% of the diameter of spray-discharge orifices 7.

Figure 3:
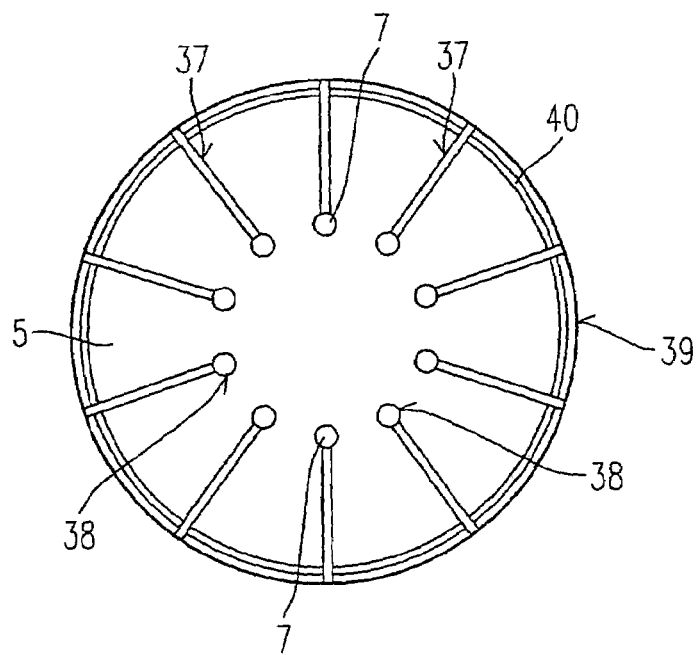
FIG. 3 shows a schematic top view of the valve-seat member of the fuel injector configured according to the present invention, counter to the spray-discharge direction.

FIG. 3 shows a schematic top view of valve-seat member 5 of fuel injector 1 configured according to the present invention, counter to the spray-discharge direction of the fuel. Identical components have been provided with identical reference numerals from FIGS. 1 and 2.

In the present exemplary embodiment, fuel injector 1 has ten spray-discharge orifices 7, which are arranged with equidistant spacing in a circle that is concentrical with respect to the circumference of valve-seat member 5. From each of spray-discharge orifices 7, one capillary 37 extends radially toward the outside, up to an edge 39 of valve-seat member 5.

The precise extension of capillaries 37 may be adjusted to the requirements as desired. For example, a plurality of capillaries 37 may extend from each spray-discharge orifice 7. Capillaries 37 may extend at arbitrary angles relative to the radius of valve-seat member 5, or capillaries 37 of adjacently located spray-discharge orifices 7 may meet and be combined into one capillary 37 in the further course. Alternatively, all capillaries 37 may discharge in one annular capillary 40, which runs concentrically to the circle of spray-discharge orifices 7.

The capillaries may be produced in a suitable manner by cutting or non-cutting metal-processing methods, such as, for example, laser drilling, milling, etching etc. In order to simplify the manufacturability, a knurled pattern, for example, extending across valve-seat member 5 may be provided, in which two parallel sets of capillaries 37, which overlap at an angle, are introduced in valve-seat member 5 in a suitable manner. To ensure that each spray-discharge orifice 7 is overlapped by one capillary 37, the loop width of the pattern should be kept sufficiently small. The loop width may be smaller than the smallest diameter of the spray-discharge orifices.

The present invention is not limited to the exemplary embodiment shown and is applicable to various numbers of arbitrarily arranged spray-discharge orifices 7, for example, and also to any configurations of inwardly opening, multi-hole fuel injectors 1.

What is claimed is:

1. A fuel injector for fuel injection systems, comprising:
 a valve-seat member having a valve-seat surface, at least two spray-discharge orifices formed in a discharge region downstream from the valve-seat surface, and an end face with capillaries formed thereon, wherein the at least two spray-discharge orifices are connected to the capillaries;
 a valve-closure member that forms a sealing seat together with the valve-seat surface; and
 an excitable actuator to activate the valve closure member;
 wherein the end face is a downstream end face of the valve seat member;
 wherein the capillaries extend from the spray discharge orifices in a radially outward direction up to an edge of the valve seat member; and
 wherein the capillaries have a maximum width of 20% of a diameter of the spray discharge orifices.

2. The fuel injector of claim 1, wherein at least one capillary is provided for each of the at least two spray discharge orifice.

3. The fuel injector of claim 1, wherein a maximum depth of the capillaries is 75% of a wall thickness of the valve seat member.

4. The fuel injector of claim 1, wherein the capillaries extend at different angles across a surface of the end face.

5. The fuel injector of claim 1, wherein the capillaries are produced by knurling, using at least two blades, and overlap each other.

6. The fuel injector of claim 1, wherein the capillaries of adjacent spray discharge orifices are combined.

7. A fuel injector for fuel injection systems, comprising:
 a valve-seat member having a valve-seat surface, at least two spray-discharge orifices formed in a discharge region downstream from the valve-seat surface, and an end face with capillaries formed thereon, wherein the at least two spray-discharge orifices are connected to the capillaries;
 a valve-closure member that forms a sealing seat together with the valve-seat surface; and
 an excitable actuator to activate the valve closure member;
 wherein the end face is a downstream end face of the valve seat member; and
 wherein the capillaries have a maximum width of 20% of a diameter of the spray discharge orifices.

8. A fuel injector for fuel injection systems, comprising:
a valve-seat member having a valve-seat surface, at least two spray-discharge orifices formed in a discharge region downstream from the valve-seat surface, and an end face with capillaries formed thereon, wherein the at least two spray-discharge orifices are connected to the capillaries;
a valve-closure member that forms a sealing seat together with the valve-seat surface;
an excitable actuator to activate the valve closure member; and
an annular capillary surrounding the valve-seat member in a concentric manner relative to the spray-discharge orifices, wherein the capillaries of the end face discharge into the annular capillary.

9. A fuel injector for fuel injection systems, comprising:
a valve-seat member having a valve-seat surface, at least two spray-discharge orifices formed in a discharge region downstream from the valve-seat surface, and an end face with capillaries formed thereon, wherein the at least two spray-discharge orifices are connected to the capillaries;
a valve-closure member that forms a sealing seat together with the valve-seat surface; and
an excitable actuator to activate the valve closure member;
wherein the end face is a downstream end face of the valve seat member; and
wherein the capillaries extend from the spray discharge orifices in a radially outward direction up to an edge of the valve seat member; and
further comprising:
an annular capillary surrounding the valve-seat member in a concentric manner relative to the spray-discharge orifices, wherein the capillaries of the end face discharge into the annular capillary.

10. The fuel injector of claim 9, wherein the capillaries extend at different angles across a surface of the end face.

* * * * *